April 18, 1939.   W. STOCKER   2,155,207
BRAKE CONSTRUCTION
Filed Nov. 27, 1935   2 Sheets-Sheet 1
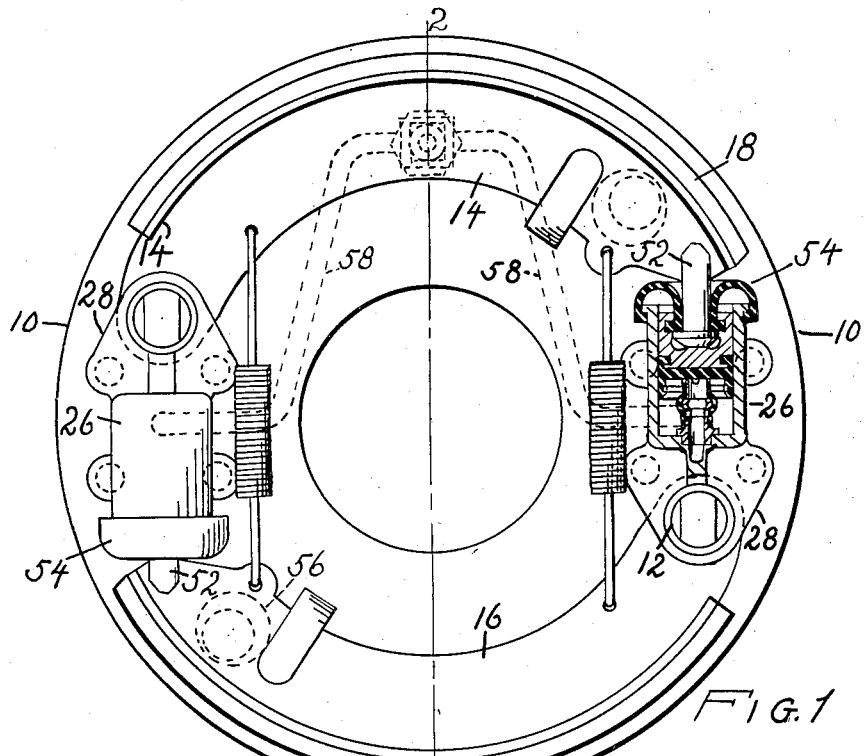
FIG.1
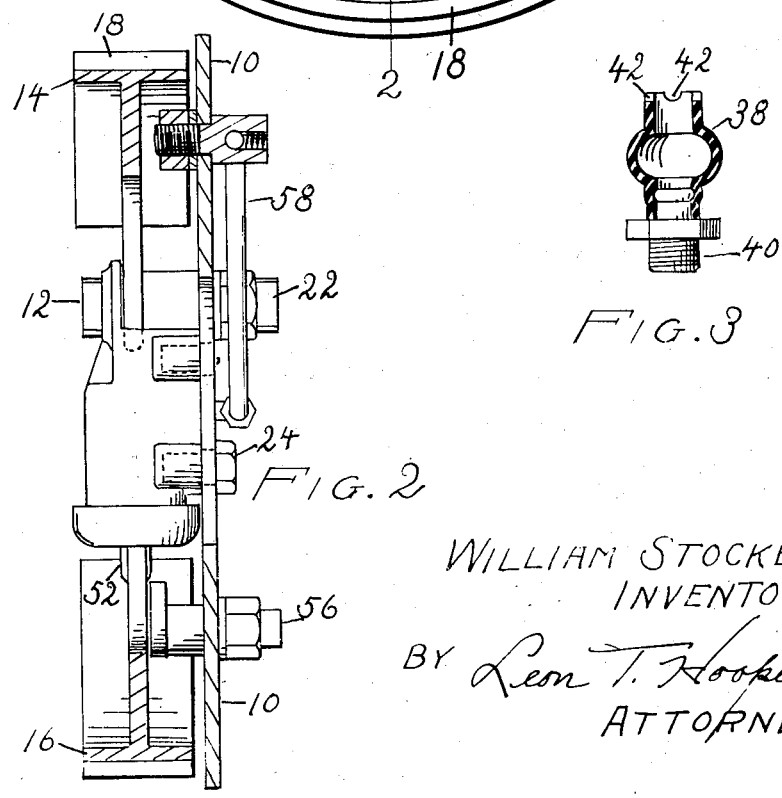
FIG.2
FIG.3
WILLIAM STOCKER
INVENTOR
BY Leon T. Hooker
ATTORNEY April 18, 1939. W. STOCKER 2,155,207
BRAKE CONSTRUCTION
Filed Nov. 27, 1935 2 Sheets-Sheet 2

WILLIAM STOCKER
INVENTOR
BY Leon T. Hooper
ATTORNEY

Patented Apr. 18, 1939

2,155,207

UNITED STATES PATENT OFFICE 2,155,207

BRAKE CONSTRUCTION

William Stocker, Hammond, Ind.

Application November 27, 1935, Serial No. 51,749

4 Claims. (Cl. 60—54.6)

This invention relates to an improved brake construction and has for one of its principal objects the provision of means for applying an equalized braking force to opposed interior sides of a brake drum.

Another and still further important object of the invention resides in the provision of means for positioning two brake shoes within a brake drum in such a manner that both shoes move identically with respect to the rotation of the drum.

Still another and further important object of the invention resides in the provision of means for bleeding air from the cylinders.

In the conventional hydraulic brake wherein two brake shoes are used, considerable difficulty has been encountered by reason of the fact that the brake shoe operating against the rotation of the drum wears down considerably faster than the brake shoe moving into engagement with the rotation of the drum. Various means of overcoming this difficulty have been more or less unsuccessfully employed, chief among them being the use of cylinders of different diameters.

Even where cylinders of different sizes are used for actuating the brake shoes, it has been found that the lining of the brake shoe actuated against the rotation of the brake drum wears down considerably faster and needs replacement more often than the lining on the brake shoe operating with the rotation of the brake drum.

Additional objects of importance and advantage will be apparent as the following detailed description progresses, reference being had to the drawings, wherein Fig. 1 is a side elevational view of the assembled brake, portions thereof being broken away.

Fig. 2 is a vertical section taken on the line 2—2 of Fig. 1.

Fig. 3 is a slightly enlarged sectional view of the bleeder attachment.

Figure 4:
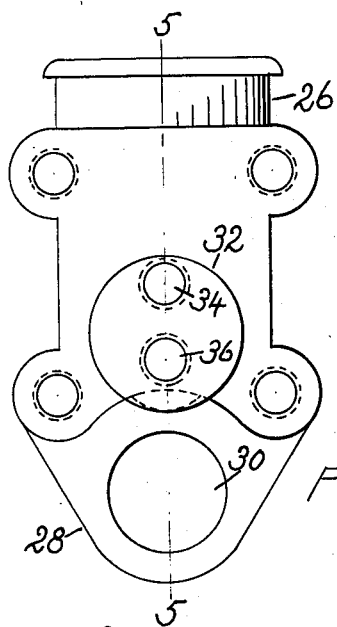
Fig. 4 is a slightly enlarged bottom plan view of one of the cylinders.

The reference numeral 10 indicates in a general way a plate to which the brake assembly is attached. In the preferred construction this plate may be a separate unit, or may form a portion of the axle housing.

Pivotally secured to the plate 10 by anchor bolts 12 is an upper brake shoe 14 and a lower brake shoe 16, which are identical in formation and are interchangeable. The brake shoes are T-shaped in cross section and have secured to their outer transverse surface a brake lining 18.

It will be noted that the anchor bolt 12 has an eccentric portion 20 which contacts the brake shoe and thus provides an adjusting means in the pivot end of the shoe. Moreover, the threaded end of the anchor bolt is squared, as indicated by the reference numeral 22 in order that adjustments may be made from either end thereof.

Secured by bolts 24 to the plate 10 on opposed sides of one surface thereof are cylinders 26.

A projecting web portion 28 of each cylinder 26 has an aperture 30 therein which forms a bearing for maintaining in proper alignment the head end of the anchor bolt 12, as is clearly shown in the drawings.

A boss 32 projecting from each cylinder and coacting with an aperture in the plate 10 provides a means for centering the cylinder. In the preferred construction of the cylinder 26 an inlet passageway 34 and an outlet passageway 36 are formed close to or in the head end of the cylinder. It will be noted that the outlet passageway 36 is screw threaded at both ends thereof.

In the preferred embodiment of the invention as shown in the drawings, it will be noted that the piston operating in one cylinder is forced upwardly, while the piston operating in the opposite cylinder is forced downwardly when the brakes are applied.

Figure 5:
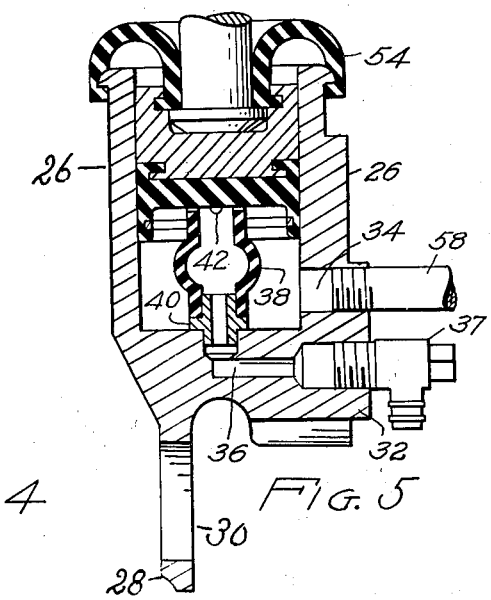
Fig. 5 is a sectional view of the cylinder taken on the line 5—5 of Fig. 4.
Figure 6:
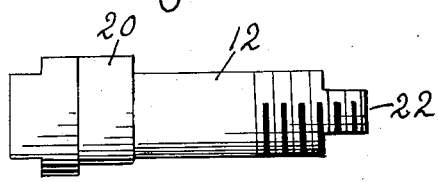
Fig. 6 is a slightly enlarged side elevational view of the cylinder anchor bolt.
Figure 7:
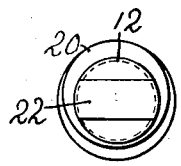
Fig. 7 is an end view of the bolt shown in Fig. 6.
Figure 8:
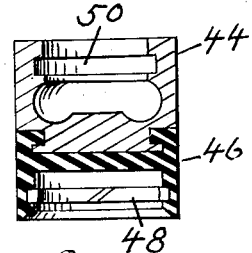
Fig. 8 is a sectional view of an assembled piston.

In the operation of hydraulic brakes it is essential that all air be removed from the cylinder. To accomplish this purpose and still allow the piston therein to operate freely, a bleeder attachment 38 which forms a permanent part of the device is provided. The base of the bleeder attachment 38 is preferably formed of a metal nipple having a screw threaded lower end 40 which is adapted to be positioned in the threaded end of the outlet passageway 36. The upper end of the attachment 38 is constructed of a soft pliable material, preferably rubber, and is centrally bulged, as is shown in Figs. 3 and 5, to allow for longitudinal compression thereof.

Formed in the upper end of the attachment 38 is a plurality of openings 42 which provide a passageway into the outlet, even when the top of the attachment is against the bottom of the piston.

Figure 9:
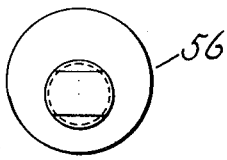
Fig. 9 is an end view of a shoe adjusting bolt.

Positioned within each cylinder is a metal piston 44 to which a resilient piston, preferably rubber, 46 is attached. Positioned within the resilient piston 46 is an expansion ring 48 which serves to spread the lower part of the resilient piston to prevent leakage of the brake actuating fluid. The upper end of the metal piston 44 is recessed at 50 to receive the piston rod 52 which is attached to and forms a part of each brake shoe. A conventional rubber cap 54 is provided for the open end of each piston. Secured to the plate 19 adjacent the moveable end of each brake shoe is an adjustment bolt 56, the location of which is best shown in Figs. 1 and 2. This adjustment bolt 56 is of the eccentric type, as is clearly shown in Figs. 1 and 9.

Suitable pipes 58 are provided for conducting an actuating fluid to the cylinders.

Positioned in the port 36 is a valve 37 which is normally closed. The valve 37 is adapted to have a pipe line attached thereto when the system is bled.

When the system is bled a pipe line is attached to the valve 37 which is then opened. When fluid is forced into the cylinder 26 through the inlet pipe 58 the fluid level in the cylinder 26 is raised thus expelling all air from the space between the resilient piston 46 and the cylinder head. The expelled air passes through the openings 42 in the bleeder attachment 38 thence downwardly therethrough and out through the port 36 and valve 37. The operation of the air bleeding system is not impaired by the piston contacting the upper end of or compressing the bleeder attachment 38.

It will be apparent from the foregoing that herein is provided a brake mechanism which applies an equalized force against opposed sides of the interior surface of a brake drum.

Furthermore, it will be apparent from the foregoing description that the cylinder actuating the brakes may be positioned to drive the pistons upwardly or downwardly, and that the piston and cylinder assemblies are identical and interchangeable with the exception of the bleeder attachment.

It is understood that the movement of the brake drum in relation to Fig. 1 will be in an anti-clockwise direction.

I am aware that many changes may be made and numerous details of construction varied throughout a wide range without departing from the principles of this invention and I, therefore, do not purpose limiting the patent granted hereon otherwise than as necessitated by the prior art, and in accordance with the appended claims.

I claim as my invention:

1. In a hydraulic brake, a vertically positioned cylinder having a piston operably positioned therein, a tubular air bleeder positioned within said cylinder, one end of said bleeder attachment being screw-threadedly attached to an outlet in the bottom of said cylinder, and the other end of said bleeder being castellated and in yieldable association with the lower end of said piston, said outlet and said tubular bleeder providing a passageway from the under surface of said piston to atmosphere.

2. In a brake having a fluid operating piston operably positioned within a vertical cylinder, the working stroke of said piston being upward, and means for eliminating the air pocket between the head of said piston and the operating fluid, said means comprising a resiliently collapsible tubular bleeder member having a castellated upper end, the resiliency of which is adapted to maintain the castellated end in constant engagement with said piston.

3. In a brake having a fluid operated piston operably positioned within a vertical cylinder, the working stroke of said piston being upward, and means for eliminating the air between the head of said piston and the operating fluid, said means comprising a longitudinally resiliently collapsible tubular bleeder member, said bleeder member having a laterally notched upper end in engagement with the bottom surface of the piston head, the resiliency of said bleeder member being adapted to maintain the upper end thereof in constant engagement with said piston.

4. A bleeder attachment for a hydraulic brake motor, said motor including a piston and cylinder in operable association, the working stroke of said piston being upward, said bleeder comprising a longitudinally resiliently collapsible tubular member, one end of said tubular member being provided with lateral openings, said end being in association with the head of said piston, the other end of said tubular member being joined to an outlet port to provide a passageway from the under surface of said piston to atmosphere, the resiliency of said tubular member being adapted to maintain the upper end of said member in constant association with the head of said piston, and means for maintaining the inner surfaces of said tubular member in spaced apart relation during the longitudinal compression of said member.

WILLIAM STOCKER.